(12) United States Patent
Ma et al.

(10) Patent No.: US 11,325,611 B2
(45) Date of Patent: May 10, 2022

(54) TORQUE FEEDBACK BASED VEHICLE LONGITUDINAL AUTOMATIC CALIBRATION SYSTEM FOR AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Lin Ma, Beijing (CN); Fan Zhu, Sunnyvale, CA (US); Xin Xu, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 497 days.

(21) Appl. No.: 16/314,440

(22) PCT Filed: Dec. 26, 2018

(86) PCT No.: PCT/CN2018/123962
§ 371 (c)(1),
(2) Date: Dec. 30, 2018

(87) PCT Pub. No.: WO2020/132956
PCT Pub. Date: Jul. 2, 2020

(65) Prior Publication Data
US 2021/0188296 A1    Jun. 24, 2021

(51) Int. Cl.
*B60W 50/06* (2006.01)
*B60W 60/00* (2020.01)
(Continued)

(52) U.S. Cl.
CPC ............ *B60W 50/06* (2013.01); *B60W 10/18* (2013.01); *B60W 30/143* (2013.01);
(Continued)

(58) Field of Classification Search
CPC .. B60W 50/06; B60W 60/0023; B60W 10/18; B60W 30/143; B60W 40/13;
(Continued)

(56) References Cited

U.S. PATENT DOCUMENTS

| | | | | |
|---|---|---|---|---|
| 5,623,906 A | * | 4/1997 | Storhok | F02D 41/0087 123/406.23 |
| 2008/0125951 A1 | * | 5/2008 | Livshiz | F02D 13/0219 701/101 |

(Continued)

FOREIGN PATENT DOCUMENTS

| | | | |
|---|---|---|---|
| CN | 108528268 A | * | 9/2018 |
| JP | 2013196595 A | | 9/2013 |

(Continued)

OTHER PUBLICATIONS

Machine translation of CN-108528268-A (Year: 2018).*
Machine translation of KR-20110114120-A (Year: 2011).*

*Primary Examiner* — Nicholas Kiswanto
*Assistant Examiner* — Mohamad O El Sayah
(74) *Attorney, Agent, or Firm* — Womble Bond Dickinson (US) LLP

(57) ABSTRACT

A calibration table usable in operating an autonomous driving vehicle (ADV) is updated. The operations comprise: determining a first torque value at a first time instant prior to executing a control command; determining a control command based on a speed of the ADV, a desired acceleration, and an associated entry in the calibration table; executing the control command; determining a second torque value at a second time instant subsequent to executing the control command; determining a torque error value as a difference between the first and second torque values; updating the associated entry in the calibration table based at least in part on the torque error value; and generating driving signals (Continued)

based at least in part on the updated calibration table to control operations of the ADV.

18 Claims, 8 Drawing Sheets

(51) Int. Cl.
  *B60W 10/18* (2012.01)
  *B60W 30/14* (2006.01)
  *B60W 40/13* (2012.01)
  *B60W 50/00* (2006.01)
(52) U.S. Cl.
  CPC ........ *B60W 40/13* (2013.01); *B60W 60/0023* (2020.02); *B60W 2050/0008* (2013.01); *B60W 2050/0026* (2013.01); *B60W 2050/0088* (2013.01); *B60W 2520/105* (2013.01); *B60W 2520/16* (2013.01)
(58) Field of Classification Search
  CPC . B60W 2050/0008; B60W 2050/0026; B60W 2050/0088; B60W 2520/105; B60W 2520/16
  See application file for complete search history.

(56) References Cited

U.S. PATENT DOCUMENTS

| | | | |
|---|---|---|---|
| 2011/0208402 A1* | 8/2011 | Sladek, Jr. | F02D 11/105 |
| | | | 701/102 |
| 2011/0288722 A1* | 11/2011 | Nicosia | F02D 41/2435 |
| | | | 701/31.4 |
| 2015/0166073 A1* | 6/2015 | D'Amato | B60W 40/076 |
| | | | 701/1 |
| 2017/0120908 A1 | 5/2017 | Oniwa et al. | |
| 2018/0086222 A1* | 3/2018 | Juang | H02J 7/0063 |
| 2018/0330173 A1* | 11/2018 | Zhu | B60W 30/143 |
| 2019/0084417 A1* | 3/2019 | Brizzi | B60K 31/045 |
| 2020/0164745 A1* | 5/2020 | Mohan | B60K 31/0066 |

FOREIGN PATENT DOCUMENTS

| | | | | |
|---|---|---|---|---|
| JP | 2015162228 A | | 9/2015 | |
| JP | 2017163366 A | | 9/2017 | |
| JP | 2018063476 A | | 4/2018 | |
| KR | 20110114120 A | * | 10/2011 | |
| WO | WO-2014149043 A1 | * | 9/2014 | ............ B60W 10/11 |
| WO | 2018029758 | | 2/2018 | |
| WO | 2018161335 | | 9/2018 | |

* cited by examiner

| Speed | Acceleration | Control Command |
|---|---|---|
| | | |
| | | |
| ⋮ 461 | ⋮ 462 | ⋮ 463 |

TORQUE FEEDBACK BASED VEHICLE LONGITUDINAL AUTOMATIC CALIBRATION SYSTEM FOR AUTONOMOUS DRIVING VEHICLES

CROSS-REFERENCE TO RELATED APPLICATION

This patent application is a U.S. National Phase Application under 35 U.S.C. § 371 of International Application No. PCT/CN2018/123962, filed Dec. 26, 2018, entitled "TORQUE FEEDBACK BASED VEHICLE LONGITUDINAL AUTOMATIC CALIBRATION SYSTEM FOR AUTONOMOUS DRIVING VEHICLES," which is incorporated by reference herein by its entirety.

TECHNICAL FIELD

Embodiments of the present disclosure relate generally to operating autonomous vehicles. More particularly, embodiments of the disclosure relate to automatic calibration in the control system of an autonomous vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Vehicle calibration information is indispensable for longitudinal control in the control system of an autonomous driving vehicle. Known manual calibration methods are not scalable.

SUMMARY

In an aspect of the disclosure, a computer-implemented method for operating an autonomous driving vehicle (ADV) is provided. The method includes: issuing a control command to control the ADV, wherein the control command is obtained from an entry of a calibration table associated with a speed and a desired acceleration of the ADV; measuring a first torque value in response to issuing the control command to the ADV; determining a torque error value as a difference between the first torque value and a second torque value measured prior to issuing the control command; and updating the associated entry in the calibration table based at least in part on the torque error value, wherein the updated calibration table is utilized to determine subsequent control commands to control the ADV.

In another aspect of the disclosure, a non-transitory machine-readable medium having instructions stored therein is provided. The instructions when executed by a processor cause the processor to perform operations for operating an autonomous driving vehicle (ADV), the operations including issuing a control command to control the ADV, wherein the control command is obtained from an entry of a calibration table associated with a speed and a desired acceleration of the ADV; measuring a first torque value in response to issuing the control command to the ADV; determining a torque error value as a difference between the first torque value and a second torque value measured prior to issuing the control command; and updating the associated entry in the calibration table based at least in part on the torque error value, wherein the updated calibration table is utilized to determine subsequent control commands to control the ADV.

In another aspect of the disclosure, a data processing system is provided. The system includes a processor; and memory coupled to the processor to store instructions, which when executed by the processor, cause the processor to perform operations for operating an autonomous driving vehicle (ADV), the operations including: issuing a control command to control the ADV, wherein the control command is obtained from an entry of a calibration table associated with a speed and a desired acceleration of the ADV, measuring a first torque value in response to issuing the control command to the ADV, determining a torque error value as a difference between the first torque value and a second torque value measured prior to issuing the control command, and updating the associated entry in the calibration table based at least in part on the torque error value, wherein the updated calibration table is utilized to determine subsequent control commands to control the ADV.

BRIEF DESCRIPTION OF THE DRAWINGS

Embodiments of the disclosure are illustrated by way of example and not limitation in the figures of the accompanying drawings in which like references indicate similar elements.

FIG. 4 shows an example of calibration table according to one embodiment.

DETAILED DESCRIPTION

Figure 1:
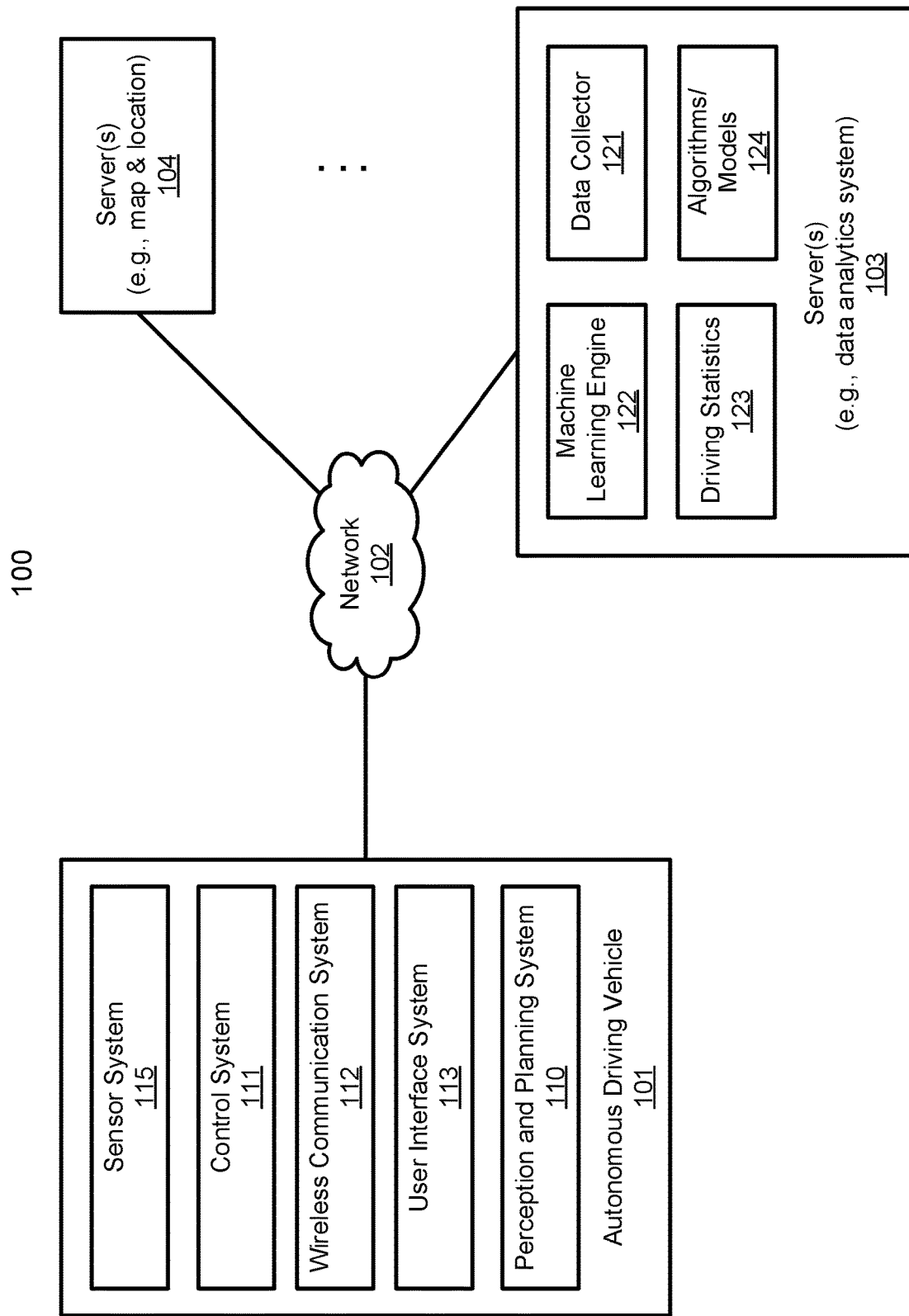
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a calibration table usable in operating an autonomous driving vehicle (ADV) is updated. First, a first torque value is determined at a first time instant prior to executing a control command. A control command is determined based on a speed of the ADV, a desired acceleration, and an associated entry in the calibration table. The calibration table is used in the control of the speed of the ADV, and comprises a plurality of entries, each of which comprises a speed, an acceleration, and a control command comprising a throttle or brake percentage. The associated entry is the entry whose speed corresponds to the ADV's current speed and whose acceleration corresponds to a desired acceleration. Thus, the calibration table yields a control command that comprises a throttle or brake percentage based on the current speed of the ADV and a desired acceleration for the ADV.

Next, the control command is executed. A second torque value is determined at a second time instant subsequent to executing the control command. A torque error value is determined as a difference between the first and second torque values. Thereafter, the associated entry in the calibration table is updated based at least in part on the torque error value. Further, driving signals are generated based at least in part on the updated calibration table to control operations of the ADV.

In one embodiment, updating the associated entry in the calibration table comprises updating the acceleration in the associated entry. In one embodiment, the updated acceleration is determined based at least in part on the acceleration in the associated entry prior to updating, the torque error value, and a cost value. In one embodiment, the first or second torque value is determined based at least in part on an effective mass of the ADV, an acceleration of the ADV, a mass of the ADV, a pitch angle of the ADV, a rolling resistance, an air drag coefficient, a speed of the ADV, and a tire radius of the ADV. In one embodiment, the effective mass of the ADV is determined based at least in part on the mass of the ADV, a moment of inertia of the ADV, and the tire radius of the ADV.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
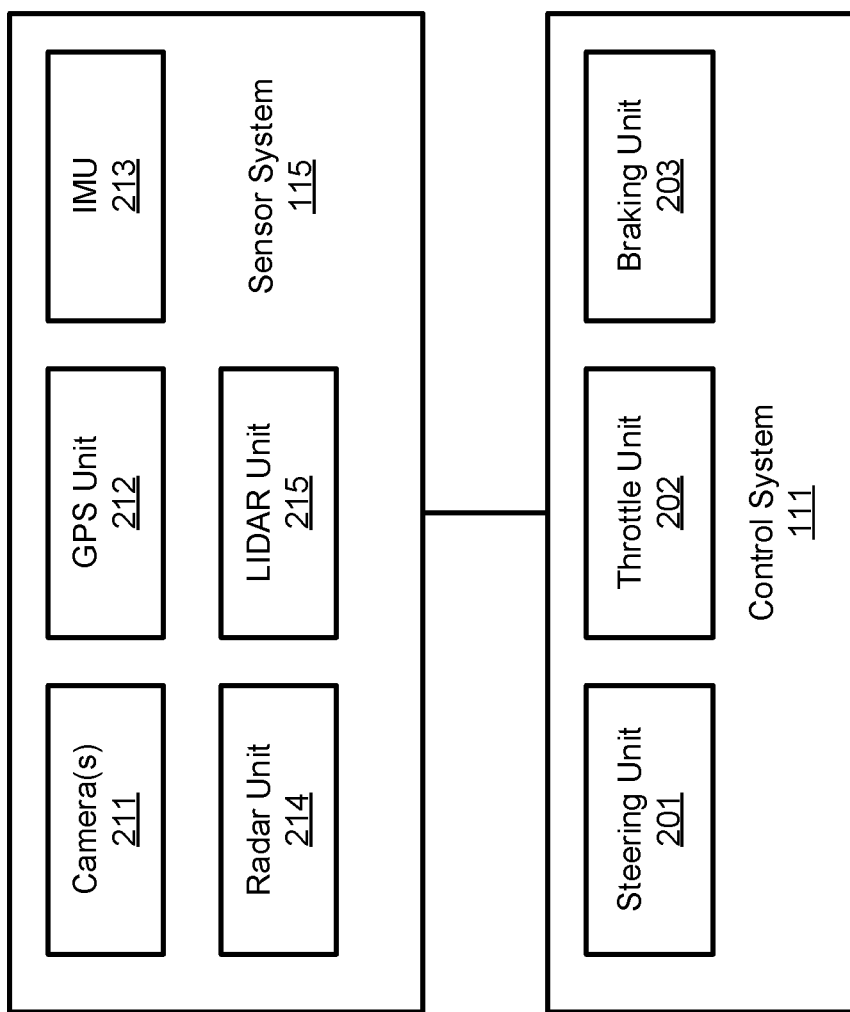
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm to automatically update a calibration table based on torque feedback according to one embodiment. Algorithms 124 can then be uploaded on ADVs to be utilized during autonomous driving in real-time.

Figure 3A:
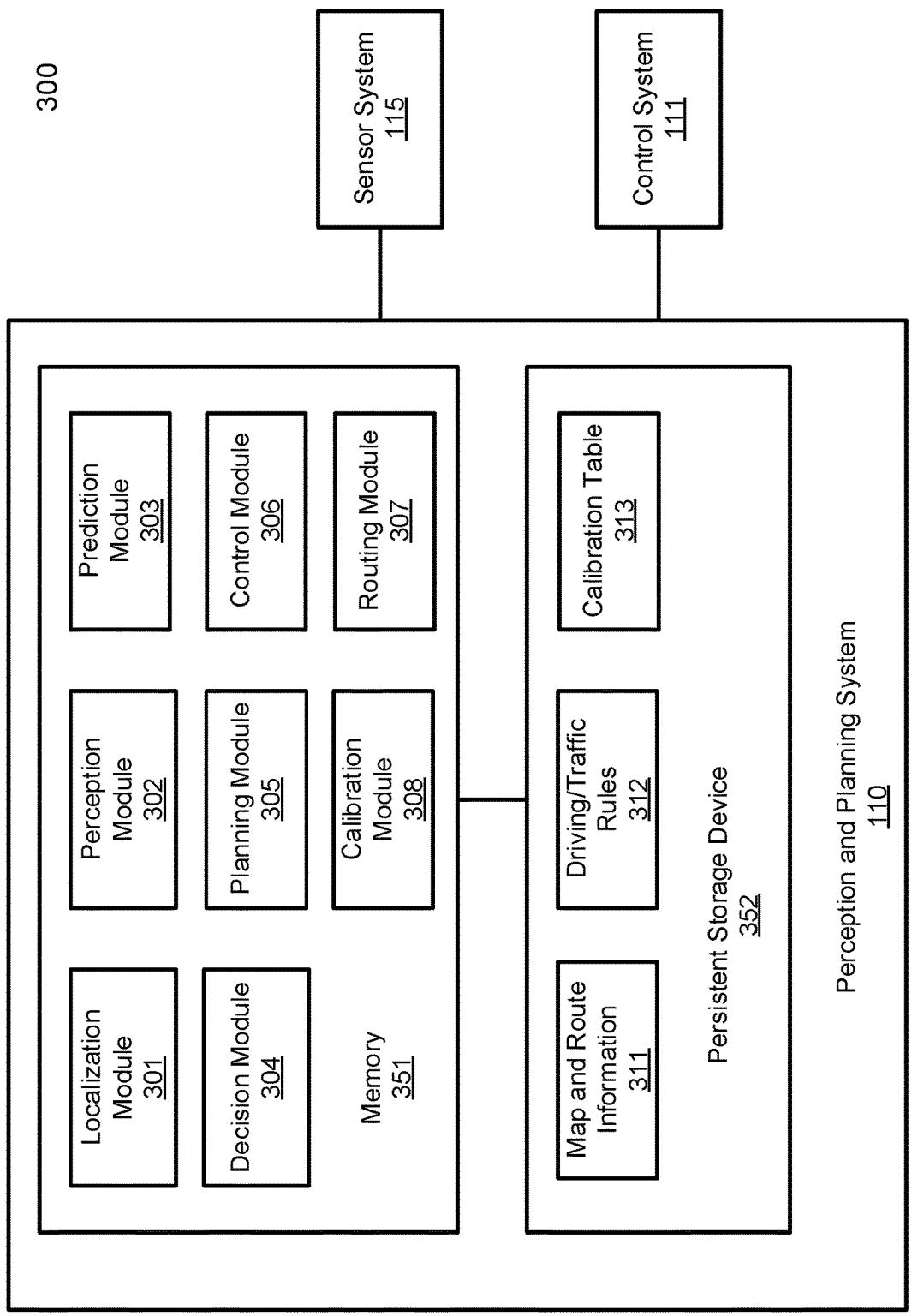
FIGS. 3A-3B are block diagrams illustrating an example of a perception and planning system used with an autonomous vehicle according to one embodiment.
Figure 3B:
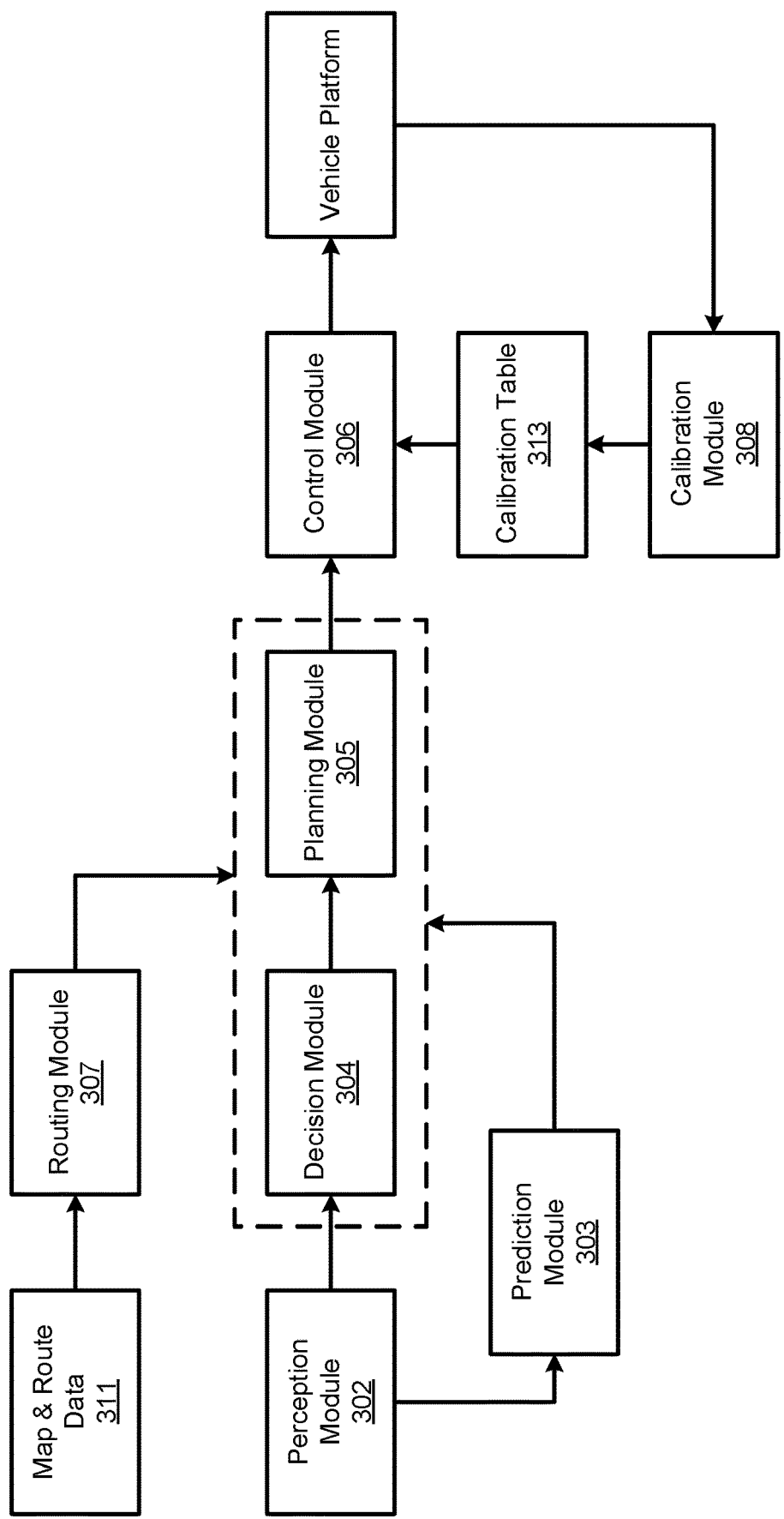

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and calibration module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, calibration module 308 may be implemented or integrated with control module 306.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, calibration module 308 is configured to calibrate or update calibration table 313 based on feedback received from the vehicle in response to various control commands issued to the vehicle automatically. FIG. 4 shows an example of calibration table 313. In one embodiment, when a control command, such as a throttle or brake command, is issued to the vehicle, a torque feedback is received from the vehicle via one or more sensors. Based on the torque feedback and the torque value derived from the desired acceleration, an error or difference between the torque feedback and the torque value can be determined. A corresponding acceleration value in the calibration table can be updated based on the torque error automatically using a predetermined algorithm.

The rationale behind this approach is that if there is an error in the calibration table, a control command obtained from the calibration table would lead to an erroneous result, i.e., torque error. By measuring the difference between the expected torque value and the actual feedback measured from the vehicle, the calibration table can be adjusted. As a result, a subsequent lookup can be performed with a lower error rate by issue proper control commands. By automatically update the calibration table based on the feedback measured at the point in time, the calibration table can be adjusted or "trained" to fit to the specific driving environment and/or specific type of vehicles.

Figure 5:
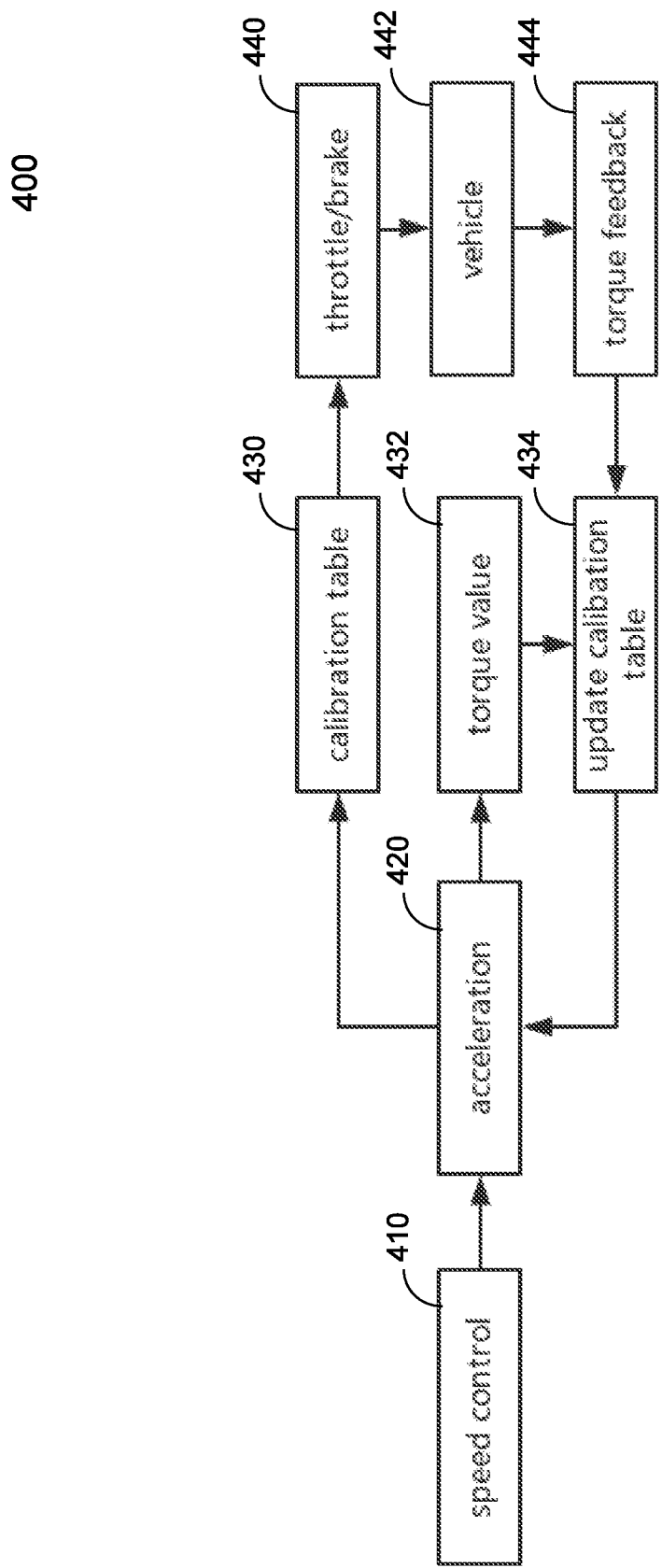
FIG. 5 is a block diagram illustrating various modules according to one embodiment.

Referring to FIG. 5, a block diagram 400 illustrating various modules according to one embodiment is shown. A speed control module 410 determines a desired acceleration 420 based on e.g., the output of the planning module. A first torque value 432 is determined at a first time instant prior to executing a control command 440. A control command 440 is determined based on a speed of the ADV 442, the desired acceleration 420, and an associated entry in the calibration table 430, which may be implemented as a part of calibration table 313 of FIGS. 3A and 3B. The calibration table 430 is used in the control of the speed of the ADV 442, and comprises a plurality of entries, each of which comprises a speed, an acceleration, and a control command comprising a throttle or brake percentage, as shown in FIG. 4. In other words, the calibration table 420 with n entries can be represented as $[v^T, a^T, cmd^T]$, where $a=[a_1,a_2,a_3, \ldots, a_n]$, $v=[v_1,v_2,v_3, \ldots, v_n]$, and $cmd=[cmd_1,cmd_2,cmd_3, \ldots, cmd_n]$.

The associated entry is the entry whose speed corresponds to the ADV 442's current speed and whose acceleration corresponds to a desired acceleration 420. Thus, the calibration table 430 yields a control command 440 that includes a throttle or brake percentage based on the current speed of the ADV 442 and a desired acceleration 420 for the ADV 442. Specifically, referring now to FIG. 4, given a current speed of the vehicle and a desired acceleration, a lookup operation can be performed in calibration table 313 to locate an entry having speed field 461 and acceleration field 462 matching the current speed of the vehicle and the desired acceleration. A control command can then be obtained from field 463 of the matching entry.

Next, the control command 440 is executed. A second torque value 444 is determined at a second time instant subsequent to executing the control command 440. A torque error value is determined as a difference between the first and second torque values 432, 444. Thereafter, the associated entry in the calibration table 430 is updated at the calibration table update module 434 based at least in part on the torque error value. Further, driving signals are generated based at least in part on the updated calibration table to control operations of the ADV.

In one embodiment, updating the associated entry in the calibration table comprises updating the acceleration in the associated entry. The updated acceleration is determined based at least in part on the acceleration in the associated entry prior to updating, the torque error value, and a cost value. In particular, for example, the acceleration in the i-th entry may be updated as follows:

$$a_i = a_i' + \frac{e_{torque\_error} \times \sigma}{1 + cost_{cmd_i,v_i}},$$

where the cost value $cost_{cmd_i,v_i} = \alpha|cmd_i - cmd_0| + \beta|v_i - v_0|$, where $a_i'$ is the acceleration prior to updating, $e_{torque\_error}$ is the torque error value, and $\alpha$, $\beta$, and $\sigma$ are tunable parameters that can be determined empirically. Command cmd0 refers to the command that has just been executed and v0 refers to a current speed of the vehicle.

In one embodiment, the first or second torque value is determined based at least in part on an effective mass of the ADV, an acceleration of the ADV, a mass of the ADV, a pitch angle of the ADV, a rolling resistance, an air drag coefficient, a speed of the ADV, and a tire radius of the ADV. The effective mass of the ADV is determined based at least in part on the mass of the ADV, a moment of inertia of the ADV, and the tire radius of the ADV. In particular, a torque value can be calculated as follows: torque=$(m_{eff} \times a + mg \cos(\alpha) \times C_{rr} + pv^2)R$, where a is the acceleration of the ADV, m is the mass of the ADV, g is the gravitational acceleration, $\alpha$ is the pitch angle, $C_{rr}$ is the rolling resistance, p is the air drag coefficient, R is the tire radius, and the effective mass of the ADV can be calculated as $$m_{eff} = m + \frac{I}{R^2},$$

where I is moment of inertia of the ADV.

Figure 6:
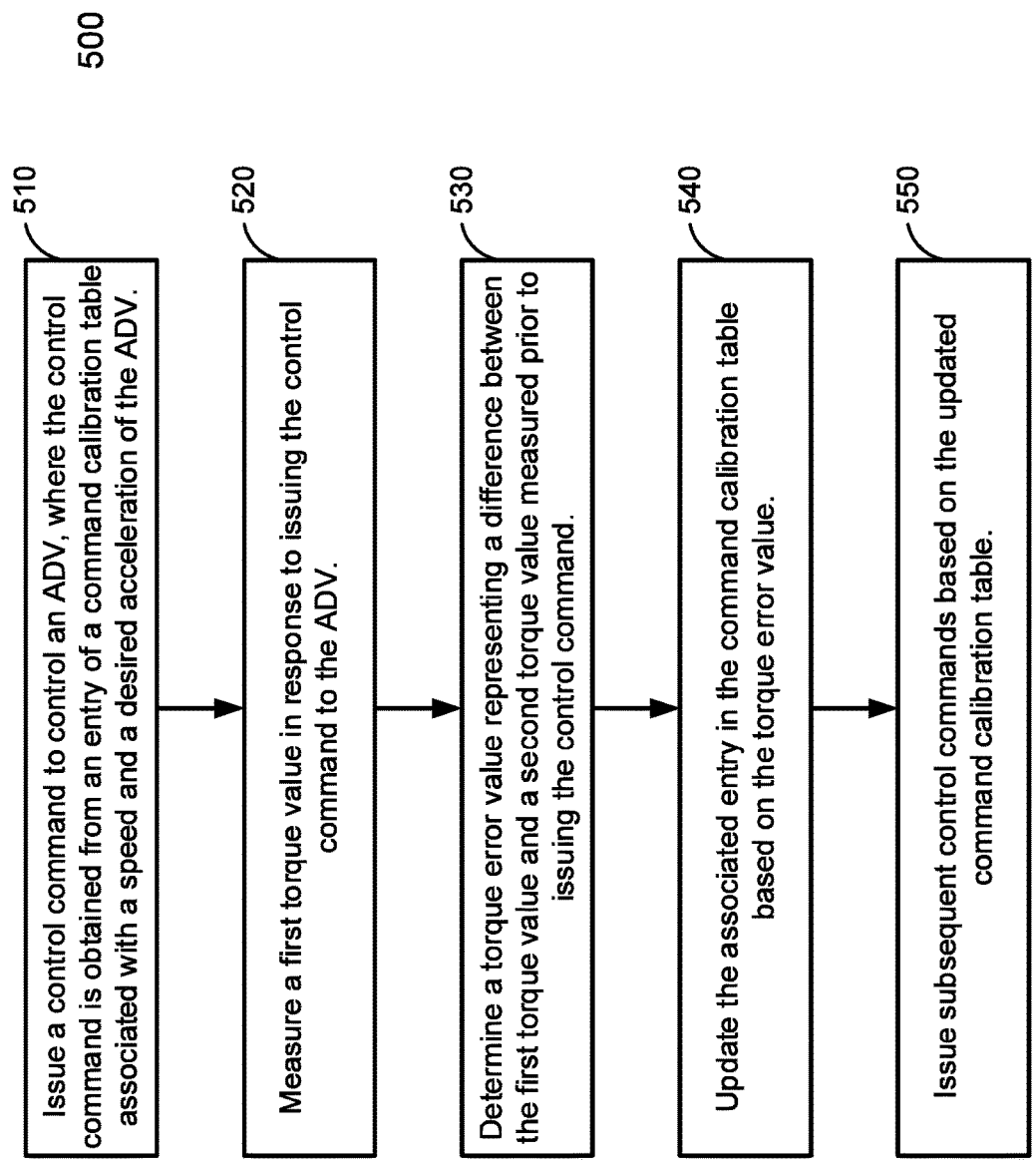
FIG. 6 is a flowchart illustrating an example method for updating a calibration table usable in operating an autonomous driving vehicle (ADV) according to one embodiment.

Referring to FIG. 6, a flowchart illustrating an example method 500 for updating a calibration table usable in operating an autonomous driving vehicle (ADV) according to one embodiment is shown. The method 500 can be implemented in hardware, software, or a combination thereof. The method 500 can be implemented in part by the calibration module 308. At block 510, a control command is issued to an ADV, where the control command was obtained from an entry a command calibration table. The entry is associated with a speed of the ADV and a desired (or targeted) acceleration of the ADV. At block 520, a first torque value is measured from the vehicle platform (e.g., using a various sensors). At block 530, a torque error value is calculated, where the torque error value represents the difference between the first torque value and a second torque value measured prior to issuing the control command. At block 540, the associated entry of the command calibration table is updated based on the torque error value. At block 550, the updated command calibration table is then utilized to obtain and issue subsequent control commands.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
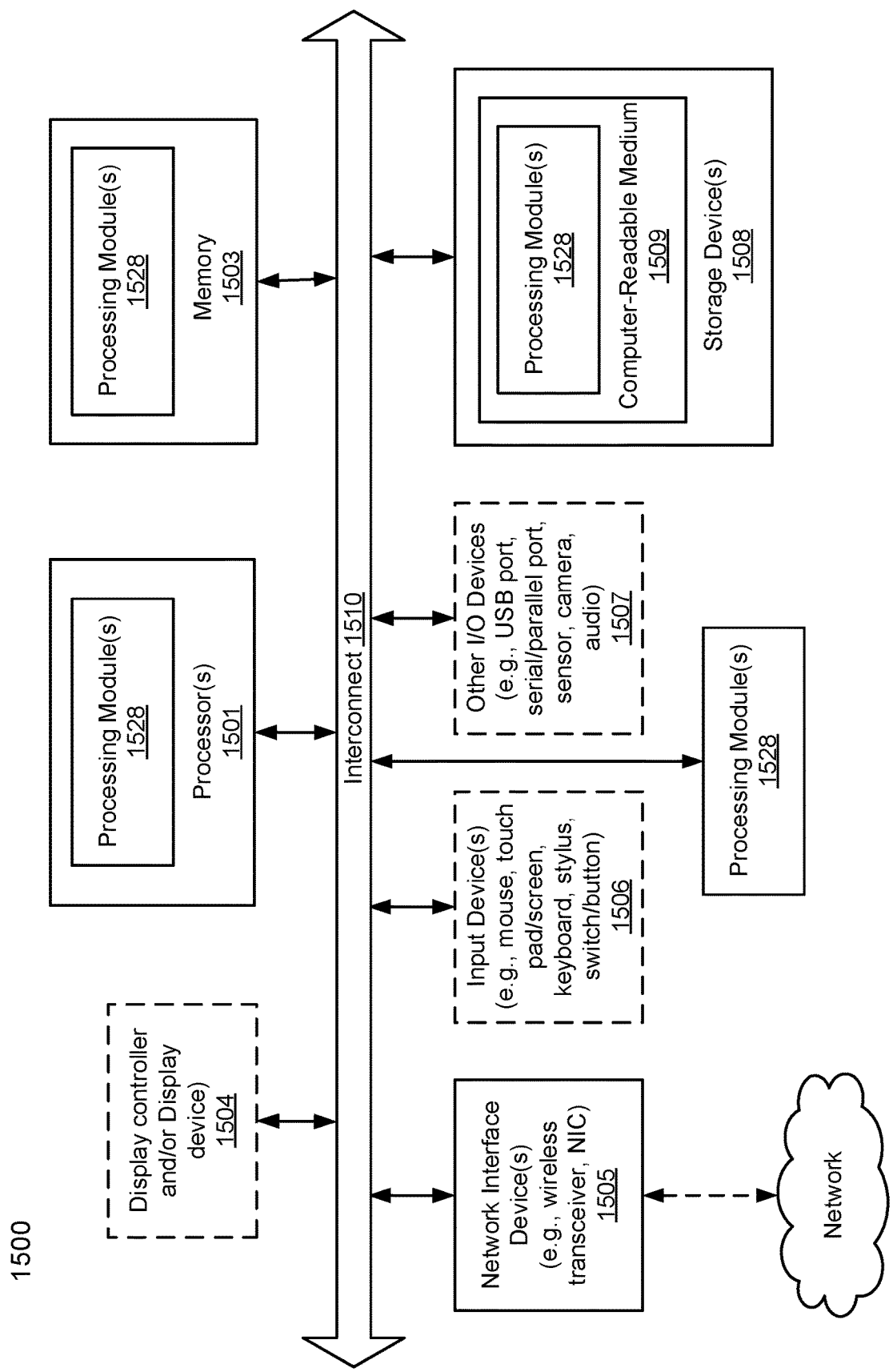
FIG. 7 is a block diagram illustrating a data processing system according to one embodiment.

FIG. 7 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, calibration module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium. 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:

issuing a control command to control the ADV, wherein the control command is obtained from an entry of a calibration table associated with a speed and a desired acceleration of the ADV;

measuring a first torque value in response to issuing the control command to the ADV;

determining a torque error value as a difference between the first torque value and a second torque value measured prior to issuing the control command; and updating the associated entry in the calibration table based at least in part on the torque error value, wherein the calibration table comprises a plurality of entries, each of which comprises an acceleration, wherein updating the associated entry in the calibration table comprises updating the acceleration in the associated entry, wherein the updated acceleration is determined based at least in part on the acceleration in the associated entry prior to updating, the torque error value, and a cost value, and wherein the cost value is determined based on a first difference between a control command of the associated entry and a previous control command that was executed; and determining a subsequent control commands based on the updated associated entry in the calibration table based at least in part on the torque error value.

2. The method of claim 1, wherein the calibration table comprises a plurality of entries, each of which further comprises a speed and a control command comprising a throttle or brake percentage.

3. The method of claim 1, wherein the cost value is further determined based on a second difference between a speed of the associated entry and a current speed of the ADV.

4. The method of claim 1, wherein the first or second torque value is determined based at least in part on an effective mass of the ADV, an acceleration of the ADV, a mass of the ADV, a pitch angle of the ADV, a rolling resistance, an air drag coefficient, a speed of the ADV, and a tire radius of the ADV.

5. The method of claim 4, wherein the effective mass of the ADV is determined based at least in part on the mass of the ADV, a moment of inertia of the ADV, and the tire radius of the ADV.

6. The method of claim 1, further comprising generating the calibration table to enable automatically calibrating the ADV based at least in part on the torque error value.

7. A non-transitory machine-readable medium having instructions stored therein, which when executed by a processor, cause the processor to perform operations for operating an autonomous driving vehicle (ADV), the operations comprising:

issuing a control command to control the ADV, wherein the control command is obtained from an entry of a calibration table associated with a speed and a desired acceleration of the ADV;

measuring a first torque value in response to issuing the control command to the ADV;

determining a torque error value as a difference between the first torque value and a second torque value measured prior to issuing the control command; and updating the associated entry in the calibration table based at least in part on the torque error value, wherein the calibration table comprises a plurality of entries, each of which comprises an acceleration, wherein updating the associated entry in the calibration table comprises updating the acceleration in the associated entry, wherein the updated acceleration is determined based at least in part on the acceleration in the associated entry prior to updating, the torque error value, and a cost value, and wherein the cost value is determined based on a first difference between a control command of the associated entry and a previous control command that was executed; and determining a subsequent control commands based on the updated associated entry in the calibration table based at least in part on the torque error value.

8. The machine-readable medium of claim 7, wherein the calibration table comprises a plurality of entries, each of which further comprises a speed and a control command comprising a throttle or brake percentage.

9. The machine-readable medium of claim 7, wherein the cost value is further determined based on a second difference between a speed of the associated entry and a current speed of the ADV.

10. The machine-readable medium of claim 7, wherein the first or second torque value is determined based at least in part on an effective mass of the ADV, an acceleration of the ADV, a mass of the ADV, a pitch angle of the ADV, a rolling resistance, an air drag coefficient, a speed of the ADV, and a tire radius of the ADV.

11. The machine-readable medium of claim 10, wherein the effective mass of the ADV is determined based at least in part on the mass of the ADV, a moment of inertia of the ADV, and the tire radius of the ADV.

12. The machine-readable medium of claim 7, wherein the operations further comprise generating the calibration table to enable automatically calibrating the ADV based at least in part on the torque error value.

13. A data processing system, comprising:

a processor; and a memory coupled to the processor to store instructions, which when executed by the processor, cause the processor to perform operations for operating an autonomous driving vehicle (ADV), the operations including:

issuing a control command to control the ADV, wherein the control command is obtained from an entry of a calibration table associated with a speed and a desired acceleration of the ADV, measuring a first torque value in response to issuing the control command to the ADV, determining a torque error value as a difference between the first torque value and a second torque value measured prior to issuing the control command, and updating the associated entry in the calibration table based at least in part on the torque error value, wherein the calibration table comprises a plurality of entries, each of which comprises an acceleration, wherein updating the associated entry in the calibration table comprises updating the acceleration in the associated entry, wherein the updated acceleration is determined based at least in part on the acceleration in the associated entry prior to updating, the torque error value, and a cost value, and wherein the cost value is determined based on a first difference between a control command of the associated entry and a previous control command that was executed; and determining a subsequent control commands based on the updated associated entry in the calibration table based at least in part on the torque error value.

14. The system of claim 13, wherein the calibration table comprises a plurality of entries, each of which further comprises a speed and a control command comprising a throttle or brake percentage.

15. The system of claim 13, wherein the cost value is further determined based on a second difference between a speed of the associated entry and a current speed of the ADV.

16. The system of claim 13, wherein the first or second torque value is determined based at least in part on an effective mass of the ADV, an acceleration of the ADV, a mass of the ADV, a pitch angle of the ADV, a rolling resistance, an air drag coefficient, a speed of the ADV, and a tire radius of the ADV.

17. The system of claim 16, wherein the effective mass of the ADV is determined based at least in part on the mass of the ADV, a moment of inertia of the ADV, and the tire radius of the ADV.

18. The system of claim 13, wherein the operations further comprise generating the calibration table to enable automatically calibrating the ADV based at least in part on the torque error value.

* * * * *